UNITED STATES PATENT OFFICE.

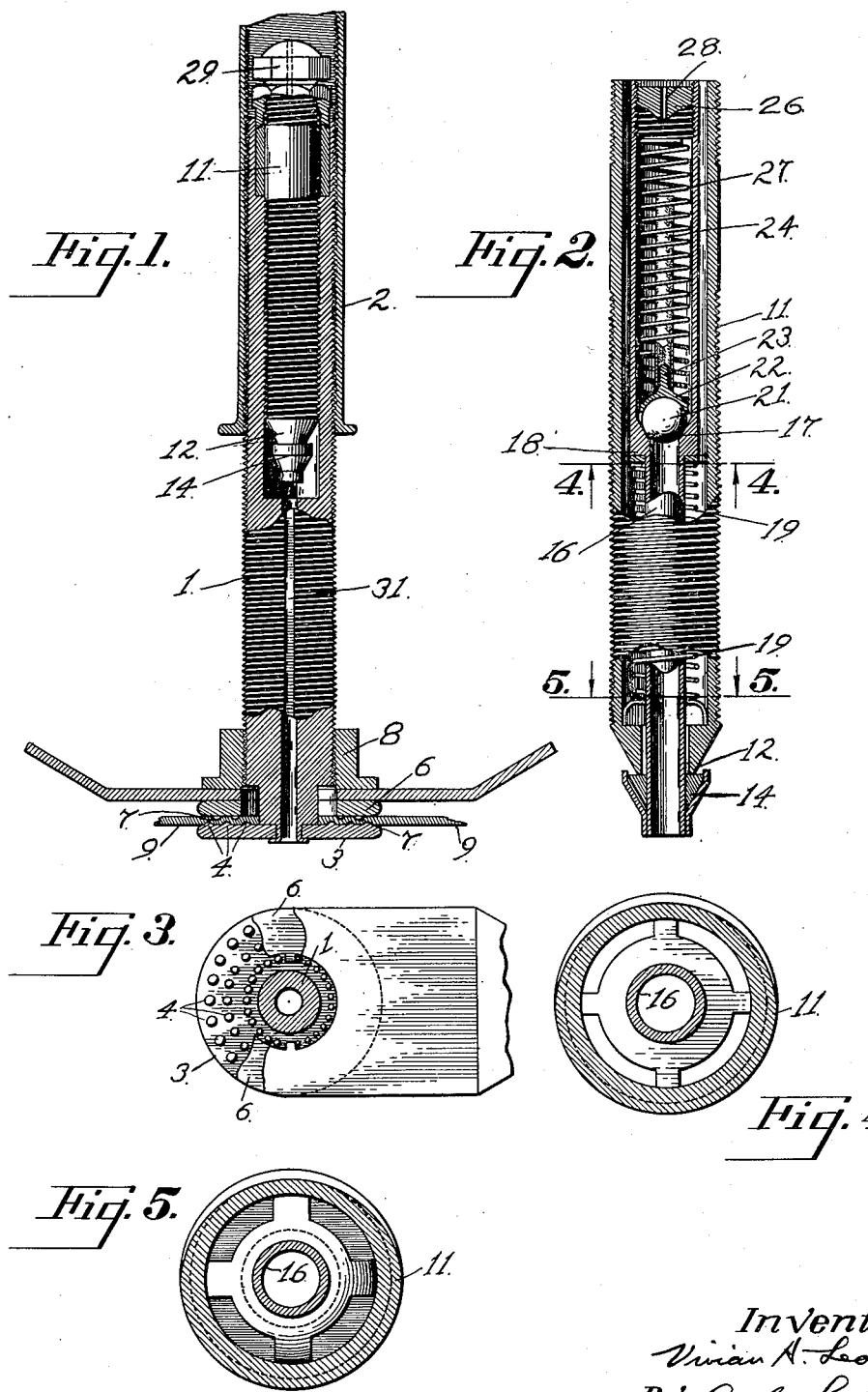

VIVIAN A. LEACH, OF SAN FRANCISCO, CALIFORNIA.

VALVE FOR INNER-TUBE VALVE-STEMS.

1,335,976.   Specification of Letters Patent.   Patented Apr. 6, 1920.

Application filed October 22, 1919. Serial No. 332,847.

*To all whom it may concern:*

Be it known that I, VIVIAN A. LEACH, a citizen of the United States, residing in the city and county of San Francisco and State of California, have invented a certain new and useful Improvement in Valves for Inner-Tube Valve-Stems, of which the following is a specification.

My invention relates to filler valves for inner tube valve stems wherein oppositely disposed valves operate in conjunction to provide improved means for inflating an inner tube up to a predetermined pressure only.

The primary object of the present invention is to provide improved means for preventing overinflation of inner tubes and the like.

It is also an object of the present invention to provide an improved device of the character described which shall be adapted to permit the discharge of air from an inner tube or the like when the pressure of said air passes a predetermined pressure.

A further object of the invention is to provide improved means for regulating the pressure at which air shall be discharged from the tube.

A still further object is the provision of means for lubricating the discharging valve to provide a seal between said valve and its seat thereby effectively sealing said valve.

Other objects will hereinafter more fully appear.

I accomplish these several objects by means of the improved device disclosed in the drawings forming a part of the present specification wherein like characters of reference are used to designate similar parts throughout the said specification and drawings, and in which:

Figure 1 is a broken vertical sectional view of an inner tube valve stem disclosing my invention applied thereto;

Fig. 2 is an enlarged view, partly in section, of the valve;

Fig. 3 is a broken detailed view disclosing the manner in which the valve stem is secured to the tube;

Fig. 4 is an enlarged transverse sectional view taken on line 4—4 of Fig. 2 in the direction indicated; and Fig. 5 is an enlarged transverse sectional view taken on line 5—5 of Fig. 2 in the direction indicated.

Referring to the drawings the numeral 1 is used to designate the usual externally and internally threaded valve stem provided with the usual dust cap 2 and an annular flange 3 on the lower end thereof having a series of projections 4 and a loosely mounted washer 6 having similar projections 7 adapted to seat between the projections 4 of the flange 3.

A nut 8 is screw-threaded upon the exterior threads of the stem 1 to move the washer 6 toward the flange 3 and thereby engage the wall of a tube 9 or the like, the projections 4 and 7 being depressed into said tube 9 to securely engage and retain the same between the said flange and washer 3 and 6 respectively.

Within the stem 1 and engaging the interior threads thereof is my improved valve comprising a tubular body 11 having a reduced valve seat 12 on the lower end thereof. This seat 12 is normally engaged by an exterior valve portion 14 of a hollow stem 16 having an interior valve seat 17 and an annular shoulder 18. A spring 19 is interposed between said shoulder 18 and the lower interior end of the said tubular body 11 to normally retain the valve 14 on the seat 12 and thereby permit the passage of air out of the tube 9.

It is understood, of course, that the pressure of air within the tube will operate in conjunction with the tension of the spring 19 to retain the valve 14 on its seat 12. A ball valve 21 is seated upon the interior valve seat 17 and has mounted thereon a cap 22 having an upwardly extending extension 23 to which is secured a wick 24 for retaining oil or other lubricant, the purpose of which will hereinafter be more fully described.

A plug 26 is screwed into the tubular body 11 above the valve 21 therein and a spring 27 interposed between the valve cap 22 and the plug 26 to normally retain the valve 21 on its seat 17, said plug 26 being provided with an aperture 28 for the passage of discharging air.

A second apertured cap 29 is screwed onto the outer upper end of the tubular body to retain the plug 26 in position. It is obvious that the tension of the spring 27 may be increased or decreased by rotating the plug 26.

In operation a compressed air connection, not shown, is applied to the outer end of the stem 1 and the air flows through the tubular body 11 and against the valve 14 thereby opening said valve against the tension of the spring 19 to permit the further passage of air into the tube 9, through a central bore 31 of the stem 1, said central bore 31 being a reduced continuation of the hollow interior of the stem 1 as disclosed in Fig. 1 of the drawings.

The stem 16 of the valve 14 being hollow it is evident that the air will flow into the said hollow stem 16 and against the valve 21. But air will also flow from the compressed air connection, not shown, through the aperture 28 of the plug 26 onto the opposite side of the valve 21 and thereby balance said pressure.

When the compressed air connection has been removed, if excessive pressure has been created within the tube, said excessive pressure will then open the valve 21 against the tension of the spring 27, the air pressure having been removed from the upper side of said valve 21 when the connection was removed, and such excess pressure will then be permitted to be discharged from the tube 9 until said pressure is slightly less than the tension of the spring 27 when said spring 27 will operate to close the valve 21 and prevent further discharge or escape of air from said tube 9.

It is obvious that the tension of the spring 27 may be regulated to provide a predetermined pressure at which air will escape from the tube 9.

It is obvious from the foregoing that I have provided a filler valve comprising oppositely disposed discharge and intake valves whereby pressure may be applied within the tube and excessive pressure may be automatically released or discharged from said tube when said excess pressure attains a predetermined pressure.

In this manner overinflation, caused by excessive heat of the pavement or friction of the tire casing, will be automatically released or discharged.

By saturating the wick 24 with a suitable lubricant said lubricant is gravitated onto the valve 21 and seat 17 thereof thereby providing a seal to facilitate the prevention of the passage of air when said valve 21 is seated.

Having thus described my invention, what I claim as new and desire to secure by Letters Patent is:

1. A valve for inner tube valve stems comprising a tubular body adapted for engagement with the interior of said stem and having a valve seat on the lower end thereof; a hollow stem within the tubular body and having an exterior valve portion adapted to engage the valve seat on the tubular body and likewise provided with an interior valve seat; and means for normally engaging the interior valve seat to prevent a return passage of air through the hollow stem below a predetermined pressure.

2. A valve for inner tube valve stems comprising a tubular body adapted for engagement with the interior of said stem and having a valve seat on the lower end thereof; a hollow stem within the tubular body and having an exterior valve portion adapted to engage the valve seat on the tubular body and likewise provided with an interior valve seat; means for normally engaging the interior valve seat to prevent a return passage of air through the hollow stem below a predetermined pressure; and means for regulating the pressure at which air may return through the hollow stem.

3. A valve for inner valve stems comprising a tubular body screw-threaded exteriorly to engage the interior threads of a valve stem and having a valve seat on the lower end thereof; a hollow stem within the tubular body having an exterior valve portion to engage said valve seat and also provided with an interior valve seat; means for normally retaining the exterior valve portion upon the valve seat of the tubular body to prevent a return passage of air through said body; a valve seated upon the interior seat of the hollow stem; means for normally retaining said last mentioned valve upon the interior valve seat to prevent a return passage of air through the hollow stem when the pressure of said air is below a predetermined pressure; and means for regulating the pressure at which said air may open the valve on the interior seat.

4. A valve for inner tube valve stems comprising a tubular body screw-threaded exteriorly to engage the interior threads of a valve stem and having a valve seat on the lower end thereof; a hollow stem within the tubular body having an exterior valve portion to engage said valve seat and also provided with an interior valve seat; means for normally retaining the exterior valve portion upon the valve seat of the tubular body to prevent a return passage of air through said body; a valve seated upon the interior seat of the hollow stem. means for normally retaining said last mentioned valve upon the interior valve seat to prevent a return passage of air through the hollow stem when the pressure of said air is below a predetermined pressure; means for regulating the pressure at which said air may open the valve on the interior seat; and a wick operatively connected to the last mentioned valve and adapted to contain a lubricant to lubricate said valve and thereby seal connection between said valve and the interior seat when said valve is seated.

In witness whereof I hereunto set my signature.

VIVIAN A. LEACH.